US012613332B2

(12) United States Patent
Hashizume et al.

(10) Patent No.: US 12,613,332 B2
(45) Date of Patent: Apr. 28, 2026

(54) INFORMATION PROCESSING DEVICE, INFORMATION PROCESSING METHOD, AND NON-TRANSITORY COMPUTER-READABLE STORAGE MEDIUM

(71) Applicant: NEC Corporation, Tokyo (JP)

(72) Inventors: Daisuke Hashizume, Tokyo (JP); Takakazu Ishii, Tokyo (JP); Hiromichi Hirata, Tokyo (JP); Shouhei Ohno, Tokyo (JP); Hiroyuki Kumeno, Tokyo (JP); Ko Makiyama, Tokyo (JP); Taro Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 322 days.

(21) Appl. No.: 18/269,601

(22) PCT Filed: Oct. 18, 2021

(86) PCT No.: PCT/JP2021/038426
§ 371 (c)(1),
(2) Date: Jun. 26, 2023

(87) PCT Pub. No.: WO2022/145111
PCT Pub. Date: Jul. 7, 2022

(65) Prior Publication Data
US 2024/0061100 A1 Feb. 22, 2024

(30) Foreign Application Priority Data
Dec. 28, 2020 (JP) ................................. 2020-218133

(51) Int. Cl.
*G01S 13/90* (2006.01)
*G06Q 50/10* (2012.01)

(52) U.S. Cl.
CPC .............. *G01S 13/90* (2013.01); *G06Q 50/10* (2013.01)

(58) Field of Classification Search
None
See application file for complete search history.

(56) References Cited

U.S. PATENT DOCUMENTS 4,170,776 A * 10/1979 Frosch ..................... G01V 1/01
342/458
5,030,957 A * 7/1991 Evans ..................... G01S 19/14
342/357.41
(Continued)

FOREIGN PATENT DOCUMENTS

CN 111504251 A 8/2020
EP 4113158 A1 * 1/2023 ......... G01S 13/9023
(Continued)

OTHER PUBLICATIONS

JP Official Communication for Japanese Patent Application No. 2022-572917, mailed on May 14, 2024 with English Translation.
(Continued)

*Primary Examiner* — Bernarr E Gregory
(74) *Attorney, Agent, or Firm* — Sughrue Mion, PLLC

(57) ABSTRACT

One purpose of this disclosure is to provide an information processing device, and the like, that make it possible to support facility inspection work. An information processing device according to one embodiment of this disclosure comprises an extraction unit for extracting, from displacement information indicating the displacement of the height of a ground surface, facility displacement information indicating the displacement of each of a plurality of facilities
(Continued)

SUPPORT SYSTEM 1000
OBSERVATION DEVICE 200
STORAGE DEVICE 300
INFORMATION PROCESSING DEVICE 100
GROUND SURFACE
TERMINAL DEVICE 400 installed on the ground surface and a calculation unit for using the facility displacement information to calculate inspection work priorities for the plurality of facilities.

10 Claims, 14 Drawing Sheets

(56)                    References Cited

U.S. PATENT DOCUMENTS 5,677,693  A  *  10/1997  Frankot ............... G01S 13/9023
                                                342/25 C
2008/0208962  A1*  8/2008  Kim ......................... H04L 67/12
                                                342/357.52
2019/0025423  A1    1/2019  Sajwaj et al.

FOREIGN PATENT DOCUMENTS

EP              4113167  A  *  1/2023  ......... G01S 13/9023
JP          H09-154243  A      6/1997
JP           2001-083243  A     3/2001
JP           2017-215248  A    12/2017
JP           2020-020740  A     2/2020

OTHER PUBLICATIONS

Takuma Anahara et al., "Deformation Measurement of Harbor Facilities With Satellite-Borne Insar Analysis", Journal of JSCE B2, Vo. 72, No. 2, pp. I_1633-I_1638, Nov. 15, 2016, <URL: https://doi.org/10.2208/kaigan.72.1_1633>.

International Search Report for PCT Application No. PCT/JP2021/038426, mailed on Nov. 22, 2021.

English translation of Written opinion for PCT Application No. PCT/JP2021/038426, mailed on Nov. 22, 2021.

Takashi Hasegawa, "Wide-Range Social Infrastructure Family Maintenance Operation Optimization Technology", Make Your Way-Detailed Commentary on Big Data/IoT, First Edition, Third Printing, Mar. 31, 2015, pp. 193-196, ISBN: 978-4-8222-7642-3.

Hiroshi Asahara et al., "Development of Real-Time Damage Estimation System for Expressway Using Earthquake Early Warning", Journal of Japan Society of Civil Engineers, Jul. 26, 2012, vol. 68, No. 4, pp. I_1068-I_1073, <URL: https://doi.org/10.2208/jscejseee.68.I_1068>, ISSN: 2185-4653.

* cited by examiner

Fig.5

| FACILITY NAME | ITEM | | | PRIORITY |
|---|---|---|---|---|
| | FACILITY DISPLACEMENT INFORMATION | IMPORTANCE OF FACILITY | ... | |
| FACILITY A | 3 | 2 | ... | 20 |
| FACILITY B | 2 | 1 | ... | 10 |
| FACILITY C | 0 | 1 | ... | 5 |

Fig.14

INFORMATION PROCESSING DEVICE, INFORMATION PROCESSING METHOD, AND NON-TRANSITORY COMPUTER-READABLE STORAGE MEDIUM

This application is a National Stage Entry of PCT/JP2021/038426 filed on Oct. 18, 2021, which claims priority from Japanese Patent Application 2020-218133 filed on Dec. 28, 2020, the contents of all of which are incorporated herein by reference, in their entirety.

TECHNICAL FIELD

The present disclosure relates to a technique for facility inspection work.

BACKGROUND ART

A business operator who manages various facilities such as power distribution facilities, communication facilities, and water supply facilities performs inspection work regularly or in case of disaster. An example of such a technique related to inspection work is disclosed in, for example, PTL 1. PTL 1 discloses that when an accident has occurred in a power distribution facility due to a disaster or the like, a patrol inspection vehicle is notified of an operation status of the power distribution facility and navigation to an accident site is performed.

CITATION LIST

Patent Literature

PTL 1: JP 9-154243 A

SUMMARY OF INVENTION

Technical Problem

However, a plurality of facilities as described above may be installed. In this case, the business operator performs inspection work on each of the plurality of facilities. For example, if the business operator serves for power distribution facilities, the business operator performs inspection work on each of a plurality of facilities such as power transmission steel towers and substations.

In order to efficiently inspect the plurality of facilities, the business operator may determine a facility on which inspection work is to be preferentially performed according to the status of the facility or the like. However, for example, if it takes time to grasp the status of the facility or if it takes time to determine a facility on which inspection work is to be preferentially performed from the status of the facility, the initial action of the inspection work is delayed. In particular, when the facilities are installed over a wide area, more time may be required. Furthermore, in case of disaster, the delay in initial action may have an effect in coping with the abnormality of the facility.

PTL 1 does not disclose a technique for determining a facility on which inspection work is to be preferentially performed from among a plurality of facilities.

The present disclosure has been made in view of the above problems, and an object of the present disclosure is to provide an information processing device and the like capable of supporting inspection work on facilities.

Solution to Problem

An information processing device according to an aspect of the present disclosure includes an extraction unit that extracts, from displacement information indicating a displacement of a height of a ground surface, facility displacement information indicating a displacement of each of a plurality of facilities installed on the ground surface, and a calculation unit that calculates inspection work priorities for the plurality of facilities by using the facility displacement information.

An information processing method according to an aspect of the present disclosure includes extracting, from displacement information indicating a displacement of a height of a ground surface, facility displacement information indicating a displacement of each of a plurality of facilities installed on the ground surface, and calculating inspection work priorities for the plurality of facilities by using the facility displacement information.

A computer-readable storage medium according to an aspect of the present disclosure stores a program for causing a computer to execute extracting, from displacement information indicating a displacement of a height of a ground surface, facility displacement information indicating a displacement of each of a plurality of facilities installed on the ground surface, and calculating inspection work priorities for the plurality of facilities by using the facility displacement information.

Advantageous Effects of Invention

According to the present disclosure, it is possible to support inspection work on facilities.

BRIEF DESCRIPTION OF DRAWINGS

FIG. 5 is a diagram illustrating an image regarding calculation of priorities according to the second example embodiment of the present disclosure.

FIG. 14 is a block diagram illustrating an example of a hardware configuration of a computer device for achieving the information processing device according to each of the first, second, third and fourth example embodiments of the present disclosure.

EXAMPLE EMBODIMENT

Hereinafter, example embodiments of the present disclosure will be described with reference to the drawings.

First Example Embodiment

An information processing device according to a first example embodiment will be described.

Figure 1:
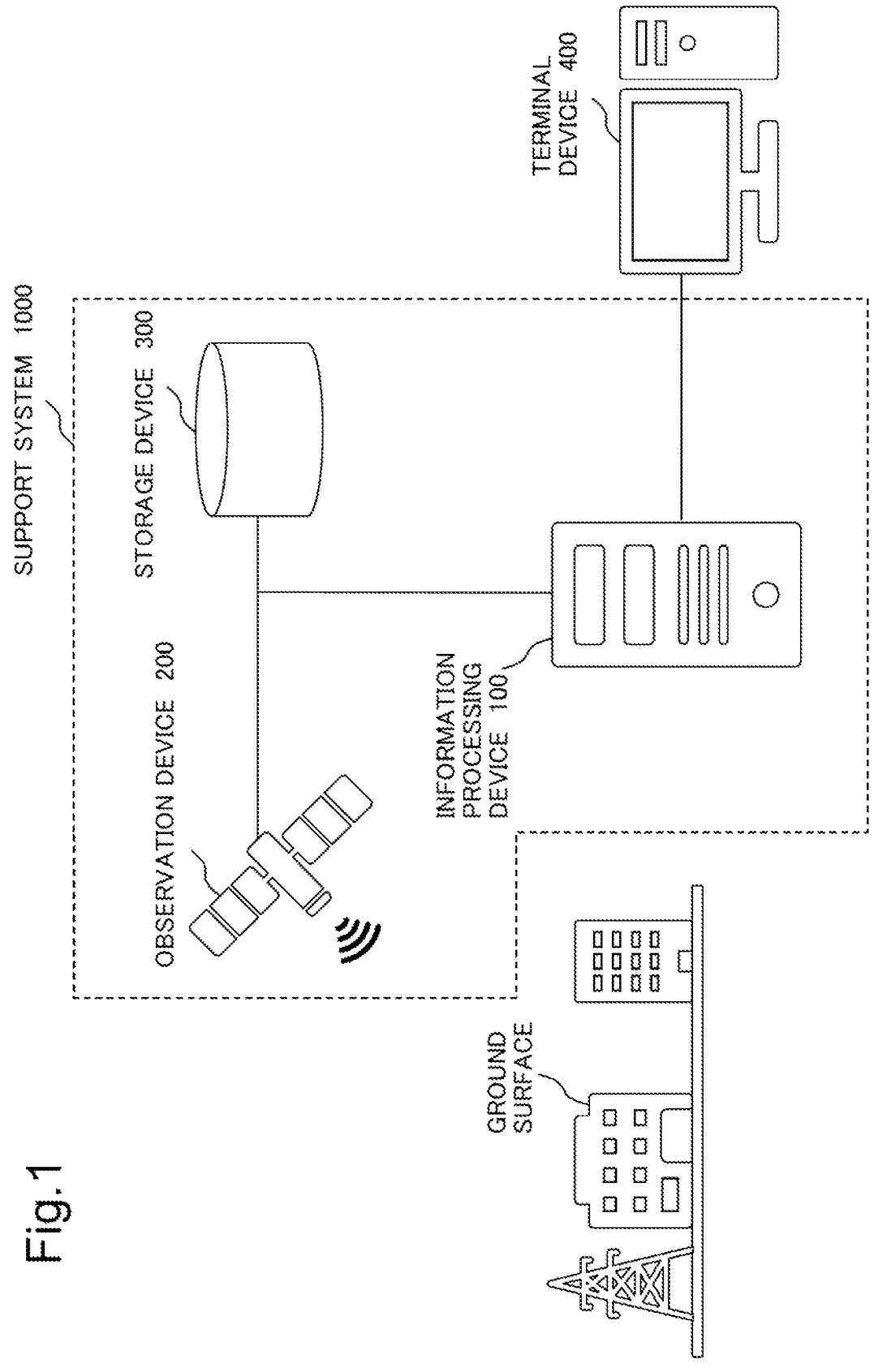
FIG. 1 is a diagram schematically illustrating an example of a configuration of a support system including an information processing device according to a first example embodiment of the present disclosure.

FIG. 1 is a diagram schematically illustrating an example of a configuration of a support system 1000 including an information processing device 100 according to a first example embodiment. As illustrated in FIG. 1, the support system 1000 includes an information processing device 100, an observation device 200, and a storage device 300. The support system 1000 may be configured to further include a terminal device 400, or may include an information processing device 100 and a storage device 300 and be configured to communicate with an observation device 200 and a terminal device 400. For example, the information processing device 100 is communicably connected to the observation device 200, the storage device 300, and the terminal device 400 via a network. The storage device 300 may be mounted on the information processing device 100. The storage device 300 stores observation data to be described below. Also, the storage device 300 may store facility information that is information regarding facilities, such as information on positions of the facilities.

The observation device 200 is, for example, an artificial satellite. In this case, the observation device 200 observes the ground surface as needed while moving on an orbit in the sky. The observation device 200 is not limited to this example. For example, the observation device 200 may be a manned or unmanned aircraft. Examples of the manned aircraft include an airplane, a helicopter, and an airship. The unmanned aircraft is also called an unmanned aerial vehicle (UAV), a small unmanned aircraft, or a drone. When a manned aircraft and an unmanned aircraft are not distinguished from each other, they are simply referred to as aircrafts. In a case where the observation device 200 is an aircraft, the observation device 200 flies, for example, in accordance with an instruction from a business operator to observe the ground surface while flying. In the present specification, the "ground surface" includes an object existing on the surface of the land. Examples of the object existing on the surface of the land include roads, forests, facilities, and other buildings.

The observation device 200 observes the ground surface from the sky, for example, using a radar mounted on the observation device 200. Specifically, the observation device 200 irradiates the ground surface with an electromagnetic wave from the sky, and acquires an electromagnetic wave reflected from the ground surface in the direction of the radar. The observation device 200 can acquire data on the ground surface by using information obtained by irradiating the electromagnetic wave and acquiring the electromagnetic wave. The data regarding the ground surface is, for example, data indicating a shape of the ground surface, data indicating a size of an object on the ground surface, data indicating a distance between the ground surface and the radar, or the like. The radar used in this manner is called a synthetic aperture radar (SAR). The method of observing the ground surface is not limited to this example. For example, the observation device 200 may acquire data regarding the ground surface by using information obtained by emitting laser light from a sensor and acquiring a reflected wave of the emitted laser light. The sensor used in this manner is called light detection and ranging (LiDAR). Although an example in which the observation device 200 is an artificial satellite and the observation device 200 is equipped with a synthetic aperture radar will be mainly described in the present specification, the observation device 200 is not limited to this example as described above. In the present specification, acquisition of data regarding the ground surface by the observation device 200 using a sensor or a radar will be referred to as "observation".

The observation device 200 observes the ground surface as needed. Then, the observation device 200 generates observation data that is data based on a result of observing the ground surface each time a predetermined range of the ground surface is observed. The observation device 200 stores the observation data, for example, in the storage device 300. The observation device 200 may store the observation data in the storage device 300 via the information processing device 100 or another device that is not illustrated. The observation data may be data indicating a result of observation by the observation device 200, or may be data indicating a result obtained by performing predetermined processing on the result of observation by the observation device 200. Here, the range of the ground surface observed by the observation device 200 will also be referred to as an observation range. The observation data may be, for example, data including a combination of position data indicating a position within the observation range and data regarding the ground surface in the observation range. For example, the observation data may be a combination of the position data and data indicating a height from a reference point of the ground surface to an observation point or data indicating a distance from the observation device 200 to the observation point. The position within the observation range may be latitude and longitude information or other information that makes it possible to specify a position on the ground surface. The position within the observation area may include information indicating an elevation. The observation data may further include data indicating a time point at which the observation is performed. The data indicating the time point may be information on a date when the observation was performed or information on a date and a time when the observation was performed. The observation data may be an image in which the position data and the data regarding the ground surface are shown on a map.

As described above, the observation device 200 can generate observation data in a wide range by observing the ground surface from the sky. Furthermore, by using the synthetic aperture radar, the observation device 200 can generate observation data obtained by observing the ground surface even in a case where the weather is bad.

The terminal device 400 may be, for example, a personal computer or a portable terminal such as a smartphone or a tablet terminal. The terminal device 400 may output information generated by the information processing device 100. For example, the terminal device 400 may output information including priorities to be described below to a display included in the terminal device 400.

[Details of Information Processing Device 100]

Figure 2:
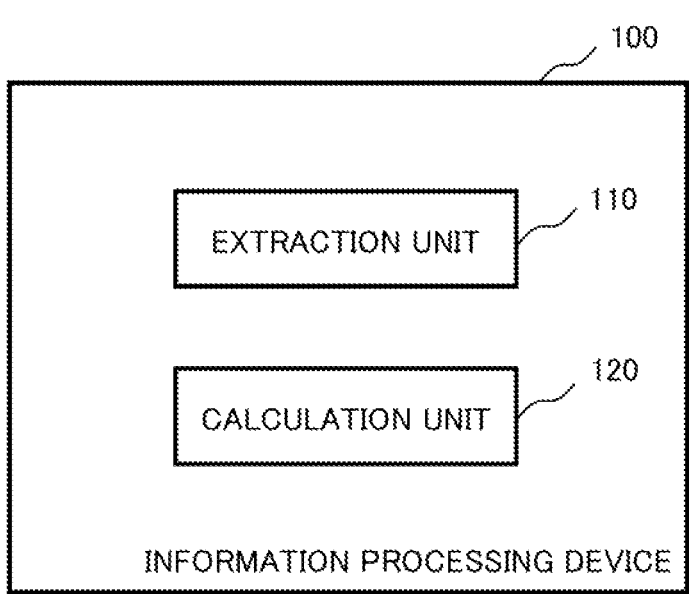
FIG. 2 is a block diagram illustrating an example of a functional configuration of the information processing device according to the first example embodiment of the present disclosure.

Next, a configuration of the information processing device 100 will be described in detail with reference to FIG. 2. FIG. 2 is a block diagram illustrating an example of a functional configuration of the information processing device 100 according to the first example embodiment. As illustrated in FIG. 2, the information processing device 100 includes an extraction unit 110 and a calculation unit 120.

The extraction unit 110 extracts facility displacement information indicating a displacement of each of a plurality of facilities from displacement information indicating a displacement of a height of the ground surface. For example, the extraction unit 110 acquires displacement information. Here, the displacement information is generated, for example, based on a difference between observation data obtained through observation at a plurality of time points. Each piece of the observation data used for generating the displacement information is, for example, observation data obtained through observation in the same observation range. Furthermore, in order to extract the facility displacement information, observation data obtained through observation in an observation range including facilities is used. The facilities are, for example, buildings managed by a business operator. In a case where the business operator is a business operator related to power distribution facilities, the facilities are, for example, power transmission steel towers, substations, and the like. In a case where the business operator is a business operator related to a communication facility, the facilities are, for example, base stations, switching stations, and the like. The facilities are not limited to this example, and may be various buildings. The extraction unit 110 extracts, for example, displacement information indicating a displacement at a position of each of the facilities as facility displacement information that is displacement information for each facility. The displacement information may be generated by the information processing device 100 or may be generated by another device that is not illustrated.

In this manner, the extraction unit 110 extracts facility displacement information indicating a displacement of each of the plurality of facilities installed on the ground surface from the displacement information indicating the displacement of the height of the ground surface. The extraction unit 110 is an example of an extraction means.

The calculation unit 120 calculates inspection work priorities for the plurality of facilities. For example, the calculation unit 120 calculates an inspection work priority for each facility according to the facility displacement information. The priority is an index indicating a degree of necessity of performing inspection work. That is, a "high priority" indicates a "high degree of necessity of performing inspection work". For example, a value of the displacement of the facility can be considered as one of indices relating to a magnitude of an inclination of the facility for a predetermined time. When the facility is inclined, the facility may be deformed or damaged, or the ground may be rising or sinking at a place where the facility is installed. That is, when the facility is inclined, an abnormality may occur in the facility or around the facility, and thus, the inclined facility is considered highly required to perform inspection work as compared with the facilities that are not inclined.

The priority is calculated, for example, as a numerical value. The calculation unit 120 may increase a priority of a facility of which a displacement indicated by the facility displacement information is equal to or more than a predetermined threshold, and decrease a priority of a facility of which a displacement indicated by the facility displacement information is smaller than the predetermined threshold. The calculation unit 120 may provide a plurality of thresholds and calculate a priority according to a threshold that the facility displacement information has exceeded. Further, the calculation unit 120 may compare pieces of facility displacement information of the plurality of facilities, and calculate priorities in such a way that a facility of which a displacement value indicated by the facility displacement information is relatively large is set to have a higher priority. For example, the priorities may be set to ten-level numerical values from 1 to 10, with a priority closer to 1 being set as a higher priority and a priority closer to 10 being set as a lower priority. For example, by using an absolute value of a displacement indicated by the facility displacement information as a priority, the calculation unit 120 may set a priority of which a value is larger to a higher priority. Further, the calculation unit 120 may calculate different priorities for the plurality of facilities, or may calculate the same priority for two or more facilities that are some of the plurality of facilities. The method of expressing priorities and the method of calculating priorities are not limited to this example.

In this manner, the calculation unit 120 calculates inspection work priorities for the plurality of facilities using the facility displacement information. The calculation unit 120 is an example of a calculation means.

[Operation of Information Processing Device 100]

Next, an example of an operation of the information processing device 100 will be described with reference to FIG. 3. Note that, in the present disclosure, each step in a sequence diagram and a flowchart is represented by a numeral assigned to each step, such as "S101".

Figure 3:
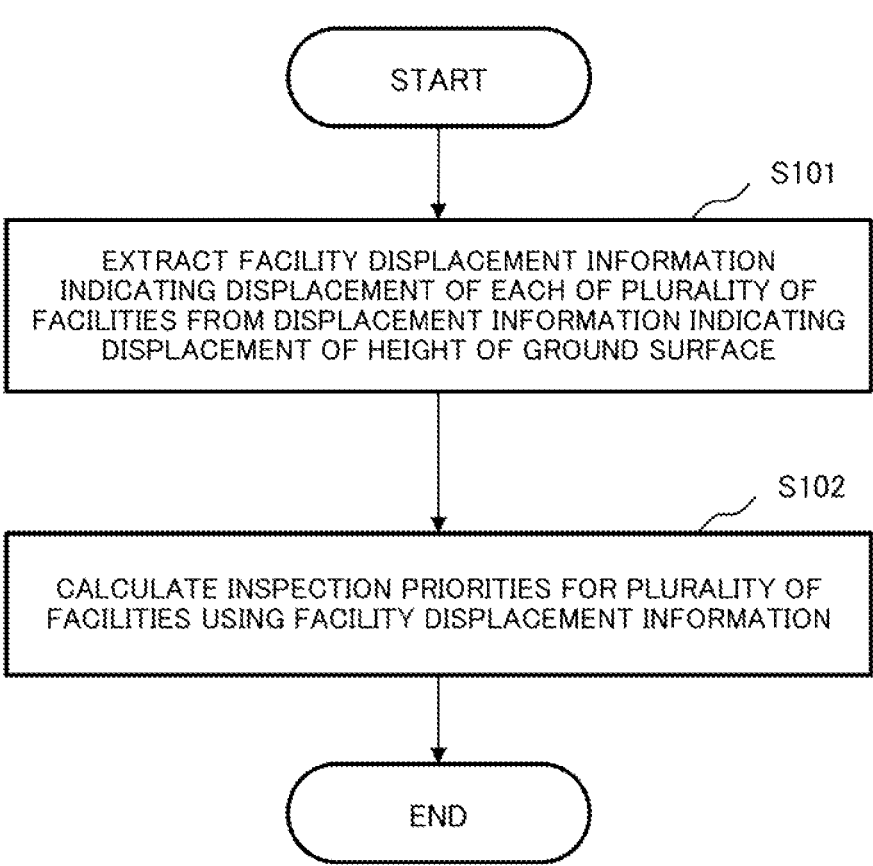
FIG. 3 is a flowchart illustrating an example of an operation of the information processing device according to the first example embodiment of the present disclosure.

FIG. 3 is a flowchart illustrating an example of an operation of the information processing device 100. The extraction unit 110 extracts facility displacement information indicating a displacement of each of a plurality of facilities from displacement information indicating a displacement of a height of the ground surface (S101). Then, the calculation unit 120 calculates inspection priorities for the plurality of facilities using the facility displacement information (S102).

After the processing of S102, the information processing device 100 may output the calculated priorities to the terminal device 400 in association with the data regarding the facilities.

In this manner, the information processing device 100 according to the first example embodiment extracts facility displacement information indicating a displacement of each of the plurality of facilities installed on the ground surface from the displacement information indicating the displacement of the height of the ground surface. Then, the information processing device 100 calculates inspection work priorities for the plurality of facilities using the facility displacement information. For example, the displacement of the facility is a magnitude of an inclination of the facility. Then, the information processing device 100 can present, for example, a facility having a large inclination, that is, a facility having a high degree of necessity of performing inspection work, among the plurality of facilities. Therefore, the information processing device 100 enables the business operator to shorten a time taken to determine a facility on which inspection work is to be preferentially performed. That is, the information processing device 100 according to the first example embodiment can support facility inspection work.

Second Example Embodiment

Figure 4:
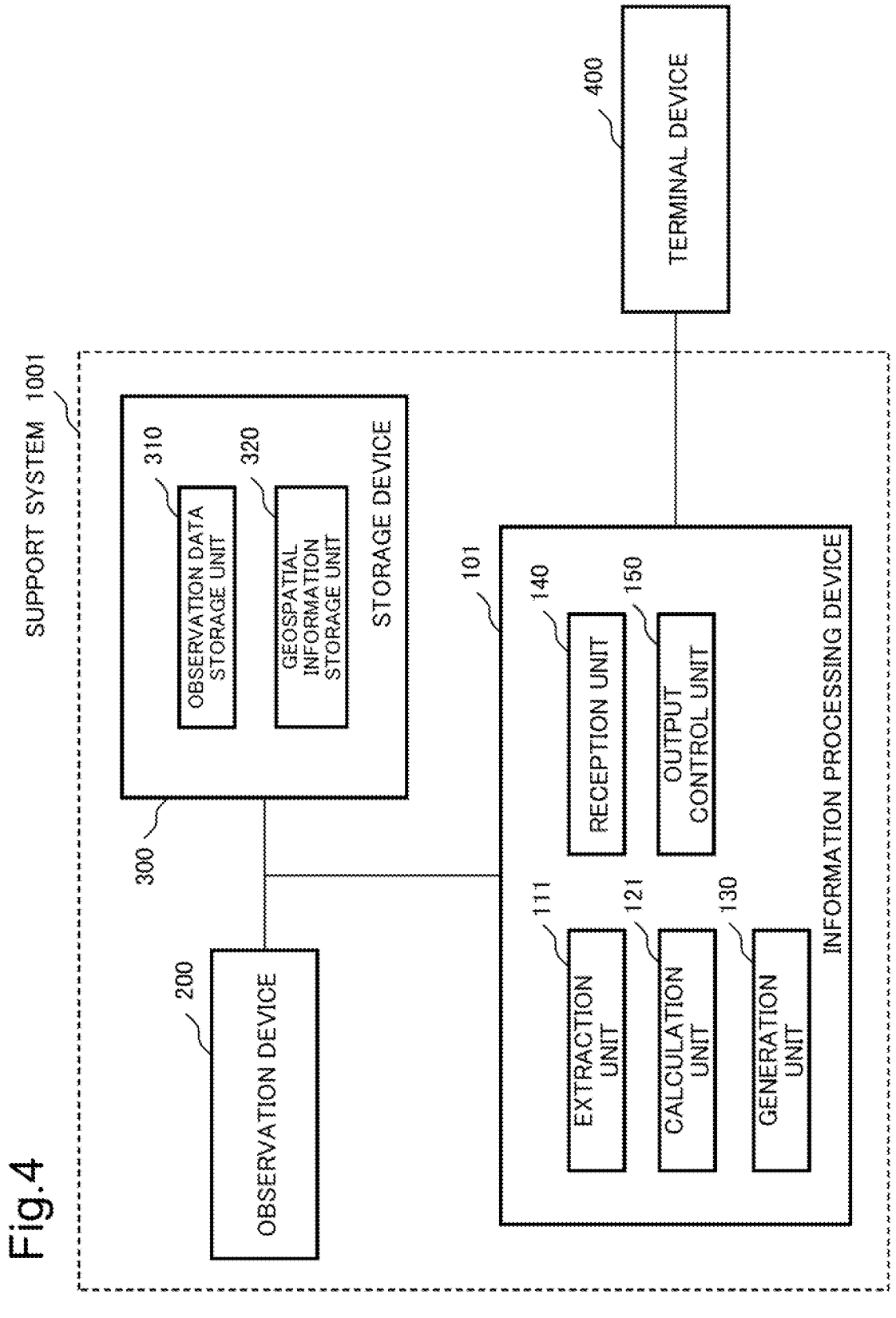
FIG. 4 is a block diagram including an example of a functional configuration of a support system according to a second example embodiment of the present disclosure.

Next, an information processing device according to a second example embodiment will be described. In the second example embodiment, the information processing device and the like described in the first example embodiment will be described in more detail. FIG. 4 is a block diagram including an example of a configuration of a support system 1001 according to the second example embodiment. As illustrated in FIG. 4, the support system 1001 includes an information processing device 101 instead of the information processing device 100 in the first example embodiment, and is otherwise similar to the support system 1000 described in the first example embodiment. That is, the support system 1001 includes an information processing device 101, an observation device 200, and a storage device 300. Note that the description in the second example embodiment overlapping with that in the first example embodiment will be partially omitted.

[Details of Storage Device 300]

The storage device 300 includes an observation data storage unit 310 and a geospatial information storage unit 320. The observation data storage unit 310 stores observation data generated by the observation device 200. For example, the observation data is transmitted from the observation device 200.

The geospatial information storage unit 320 stores geospatial information. The geospatial information is information in which positional data indicating a position on the ground surface is associated with data regarding a topographical feature of the position, data regarding an object present at the position, data regarding an event that has occurred at the position, image data indicating the position, and the like. Examples of the data regarding the topographical feature include a topographical map, information indicating a geological feature, and the like. Examples of the data regarding the object include information regarding a height and a size of a building and the like. Examples of the data regarding the event include information regarding a disaster and an accident that occurred in the past, a hazard map, and the like. Examples of the image data indicating the position include an aerial photograph, a satellite image, and the like. The geospatial information may include data obtained by measurement or investigation and information indicating a result of analysis based on the data. The geospatial information may include information artificially determined based on the data obtained by measurement or investigation. The geospatial information may include information disclosed on the Internet, such as disaster information, traffic information, and weather information. The geospatial information is used, for example, in a system called a geographic information system (GIS). The GIS outputs, for example, the above-described various data relevant to the position on the map in a superimposed manner on the map. The geospatial information is also called GIS data.

In the present example embodiment, the geospatial information includes facility information. The facility information is, for example, information indicating a name of the facility, a position of the facility, a degree of importance of the facility, a building age of the facility, and a useful life of the facility. The degree of importance of the facility is, for example, a value determined by a business operator that manages the facility. For example, when the facility is a power transmission steel tower, the degree of importance of the power transmission steel tower is set to be higher as being closer to a power transmission source. The facility information is not limited to this example. For example, the facility information may include information on an inspection history including a date and time of an inspection performed on the facility and an inspection detail. The geospatial information is associated with, for example, a position on the ground surface and facility information of a facility installed at the position.

The geospatial information may include information measured and detected by various sensors installed in the facility or around the facility. For example, the geospatial information may include a measurement result of a sensor that measures a degree of progress of corrosion such as rust generated in the facility. The geospatial information may include a detection result of a sensor that detects oil leakage, water leakage, and electric leakage in the facility. Further, the geospatial information may include captured images obtained by capturing images inside and around the facility. In this manner, the information measured and detected by the various sensors may be stored in the geospatial information storage unit 320 as needed. In this case, the various sensors are communicably connected to the storage device 300 via a network.

[Details of Information Processing Device 101]

As illustrated in FIG. 4, the information processing device 101 includes an extraction unit 111, a calculation unit 121, a generation unit 130, a reception unit 140, and an output control unit 150. Note that each of the extraction unit 111 and the calculation unit 121 performs an operation to be described below in addition to the operation of each of the extraction unit 110 and the calculation unit 120.

The extraction unit 111 extracts facility displacement information from displacement information. Specifically, the extraction unit 111 extracts a value of a displacement relevant to a position of a facility as facility displacement information from the displacement information. The facility to be extracted may be set in advance, or may be set according to a request from the terminal device 400 received by the reception unit 140 to be described below. The displacement information is generated by the generation unit 130 to be described below.

The calculation unit 121 calculates inspection work priorities for the plurality of facilities using the facility displacement information and the geospatial information. For example, the calculation unit 121 calculates respective scores associated to the facility displacement information and the facility information for each facility. Then, the calculation unit 121 calculates a total value of the calculated scores as a priority of the facility. For example, the score calculated from the facility displacement information may be set to a value corresponding to a predetermined threshold when the facility displacement information exceeds the predetermined threshold, such as 1 when the facility displacement information exceeds a first threshold and 2 when the facility displacement information exceeds a second threshold. Alternatively, the score calculated from the facility displacement information may be a value itself of a displacement indicated by the facility displacement information. In addition, for example, the score calculated from the degree of importance of the facility included in the facility information may be a value itself set as the degree of importance. For example, the score calculated from the building age of the facility may be a value to corresponding to a predetermined threshold when the building age exceeds the predetermined threshold, or may be a value itself of the building age of the building. The example of the calculated score is not limited to this example. For example, the calculated score may be a score calculated according to a difference between a building age of the facility and a useful life of the facility. Alternatively, the calculated score may be, for example, a score calculated according to a distance between a site where a disaster occurred, such as a site where an earthquake occurred or a flood site of a river, and a position of the facility. Alternatively, the calculated score may be, for example, a score calculated according to information on a measurement result regarding a degree of progress of corrosion of the facility or a detection result regarding oil leakage, water leakage, and electric leakage in the facility. The calculated score may be a score calculated according to various data included in the geospatial information storage unit 320, not limited to the facility information.

FIG. 5 is a diagram illustrating an image regarding calculation of priorities. The calculation unit 121 calculates a score for each item such as "facility displacement information" and "degree of importance of facility" for each facility. Then, the calculation unit 121 calculates a total value of the calculated scores as a priority for each facility. In an example of FIG. 5, the priority of "facility A" is "20", the priority of "facility B" is "10", and the priority of "facility C" is "5". In this case, the "facility A" has the highest inspection work priority, and the "facility C" has the lowest inspection work priority. The method of calculating priorities is not limited to the above-described example. For example, the calculated score may be weighted for each item.

The generation unit 130 generates displacement information based on the observation data. Specifically, the generation unit 130 reads the observation data from the observation data storage unit 310. At this time, the generation unit 130 reads observation data obtained through observation in the same range and at a plurality of time points. In a case where the observation data are images obtained by the synthetic aperture radar, the generation unit 130 may generate displacement information, for example, by comparing pixels relevant to the same position in a plurality of pieces of observation data. The generation unit 130 may generate displacement information by using a technique called interference SAR using a plurality of pieces of observation data. The range of the generated displacement information may be all of the observation range or a preset range within the observation range. In addition, the generation unit 130 stores the generated displacement information in the geospatial information storage unit 320 as geospatial information. In this manner, the generation unit 130 generates displacement information based on the observation data obtained at a plurality of time points. The generation unit 130 is an example of a generation means.

Note that the generation unit 130 may generate displacement information each time observation data is generated (that is, each time observation data is stored in the observation data storage unit 310), or may calculate displacement information according to a predetermined request from the terminal device 400. For example, it is assumed that, when a disaster occurs in a predetermined range, a request for outputting displacement information in the predetermined range before and after the disaster occurs is received by the reception unit 140 to be described below. In such a case, the generation unit 130 may calculate displacement information by using observation data obtained through observation in the predetermined range before and after the disaster. Here, when there is a request as described above, the observation device 200 may not perform observation in the predetermined range after the disaster. In such a case, the generation unit 130 may generate displacement information by using observation data obtained through observation by an observation device different from the observation device 200. For example, it is assumed that the observation device 200 is one of the satellites of the satellite constellation. At this time, the generation unit 130 may generate displacement information by using observation data obtained in the predetermined range after the disaster by another satellite among the satellites of the satellite constellation and observation data obtained in the predetermined range before the disaster by the observation device 200. The another satellite may be a satellite having a shorter regression cycle than the observation device 200 in order to improve real-time observation. Alternatively, the generation unit 130 may generate displacement information by using observation data obtained in the predetermined range before the disaster by the observation device 200 and observation data obtained in the predetermined range after the disaster by an aircraft different from the observation device 200. That is, the generation unit 130 may generate displacement information based on observation data generated by one observation device and observation data generated by another observation device. As a result, when there is a request as described above, the information processing device 101 can quickly generate displacement information, and accordingly, can quickly calculate priorities.

The reception unit 140 receives a request from the terminal device 400. For example, the request is notified when a user performs a predetermined input to the terminal device 400. The reception unit 140 receives, for example, a priority output request from the terminal device 400. The priority output request includes, for example, information designating a facility for which a priority is to be calculated. In addition, the reception unit 140 receives a geospatial information output request from the terminal device 400. The geospatial information output request includes, for example, information such as the type of information to be output and the range (a position on a map) of information to be output.

The output control unit 150 outputs various types of information to the terminal device 400. For example, when the reception unit 140 receives a priority output request from the terminal device 400, the output control unit 150 outputs priorities calculated by the calculation unit 121 to the terminal device 400. At this time, the output control unit 150 controls a display device, e.g., a display or the like included in the terminal device 400, to display information indicating the priorities. In addition, when the reception unit 140 receives a geospatial information output request from the terminal device 400, the output control unit 150 outputs, for example, a position on the ground surface designated in the output request and information related to the position and designated in the output request to the terminal device 400.

Figure 6:
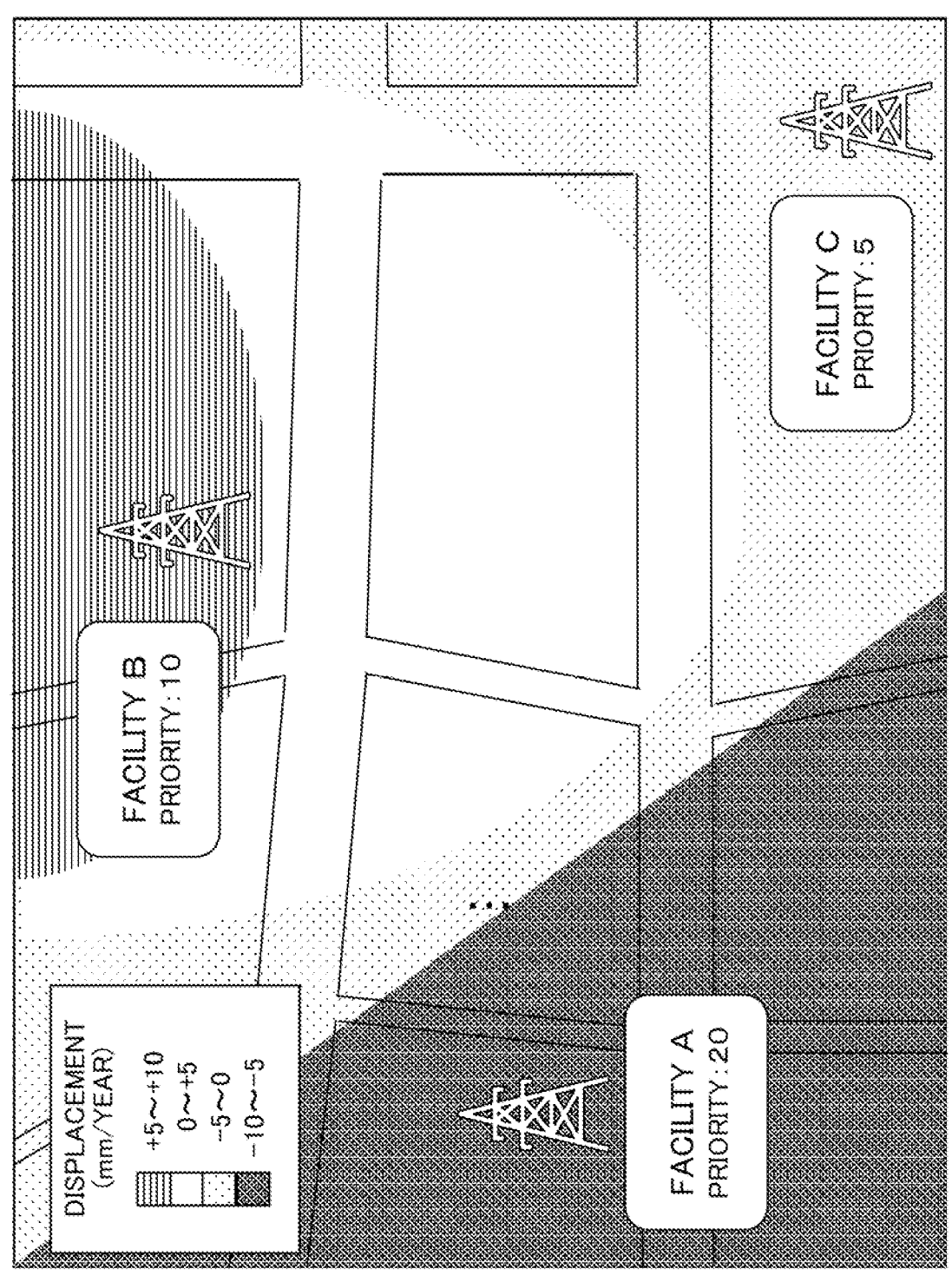
FIG. 6 is a diagram illustrating an example of an output image according to the second example embodiment of the present disclosure.

The output control unit 150 may output the information designated in the output request as character information or in a table format. The output control unit 150 may output an image obtained by superimposing the designated information on a map to the terminal device 400. FIG. 6 is a diagram illustrating an example of an image output by the output control unit 150. In FIG. 6, icons indicating facilities are superimposed at positions where the facilities are located on a map. In FIG. 6, displacement information and information on priorities relevant to the facilities are further superimposed on the map. In the example of FIG. 6, the displacement information is expressed by hatching the map with different patterns depending on displacement values. The output control unit 150 may further blink or color an icon of a facility having a priority equal to or more than a predetermined value in order to emphasize the facility having the priority equal to or more than the predetermined value. The output control unit 150 may control an output in such a way that, when a facility is selected by the user, detailed information (e.g., facility information, displacement information, priority, and the like) of the selected facility is displayed on the terminal device 400. In this case, the user selects a facility, for example, by clicking the icon of the facility or the like through the terminal device 400, and the reception unit 140 receives that the facility has been selected by the user. Then, when the reception unit 140 receives that the facility has been selected, the output control unit 150 outputs detailed information of the selected facility to the terminal device 400.

[Operation of Information Processing Device 101]

Figure 7:
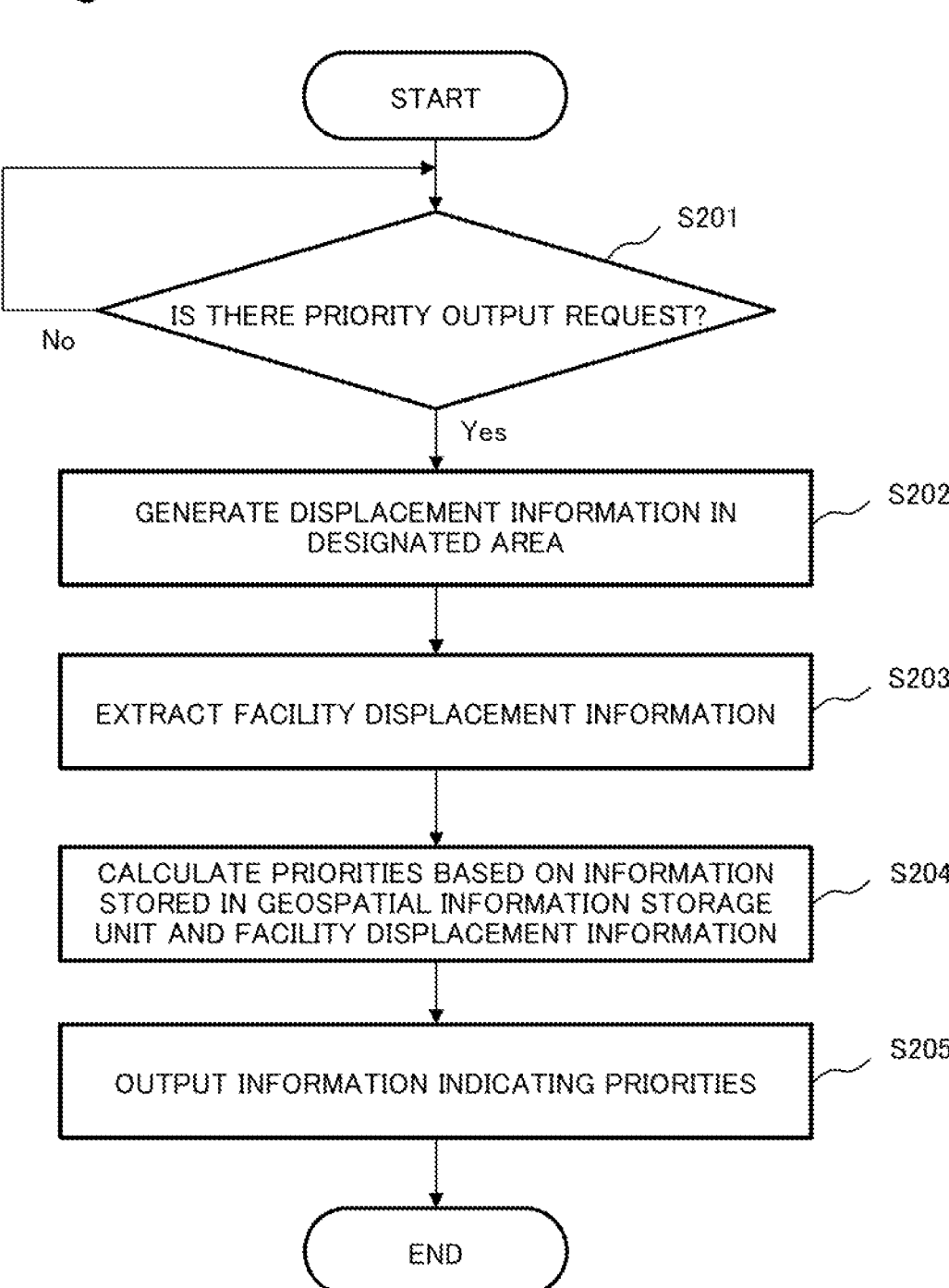
FIG. 7 is a flowchart illustrating an example of an operation of an information processing device according to the second example embodiment of the present disclosure.

Next, an operation of the information processing device 101 will be described. FIG. 7 is a flowchart illustrating an example of an operation of the information processing device 101. Note that, in the present example of the operation, it is assumed that the observation device 200 observes the ground surface as needed and observation data is stored in the observation data storage unit 310.

When the reception unit 140 does not receive a priority output request from the terminal device 400 ("No" in S201), the information processing device 101 stands by. When the reception unit 140 receives a priority output request from the terminal device 400 ("Yes" in S210), the generation unit 130 generates displacement information in a designated range (S202). In this case, the designated range is, for example, a range including designated facilities based on information designating the facilities included in the output request. Then, the extraction unit 111 extracts facility displacement information from the displacement information (S203). The calculation unit 121 calculates priorities based on the information stored in the geospatial information storage unit 320 and the facility displacement information (S204). Then, the output control unit 150 outputs information indicating the priorities to the terminal device 400 (S205).

In this manner, the information processing device 101 according to the second example embodiment extracts facility displacement information indicating a displacement of each of the plurality of facilities installed on the ground surface from the displacement information indicating the displacement of the height of the ground surface. Then, the information processing device 101 calculates inspection work priorities for the plurality of facilities using the facility displacement information. As a result, the information processing device 101 according to the second example embodiment has the same effect as the information processing device 100 according to the first example embodiment. That is, the information processing device 101 according to the second example embodiment can support facility inspection work.

In addition, the information processing device 101 according to the second example embodiment may calculate priorities by further using facility information including at least one of degrees of importance of the facilities, building ages of the facilities, useful lives of the facilities, information on positions of the facilities, or inspection histories of the facilities, together with the facility displacement information.

Furthermore, the information processing device 101 may calculate priorities by further using information on a distance between a site where a disaster occurred and the position of each of the facilities. As a result, the information processing device 101 can calculate priorities in consideration of various types of information. Therefore, the information processing device 101 can support facility inspection work in a more appropriate way.

First Modification

In the second example embodiment, the example has been described in which the information processing device 101 generates displacement information after receiving a priority output request from the terminal device 400. The timing at which the displacement information is generated is not limited to this example.

Figure 8:
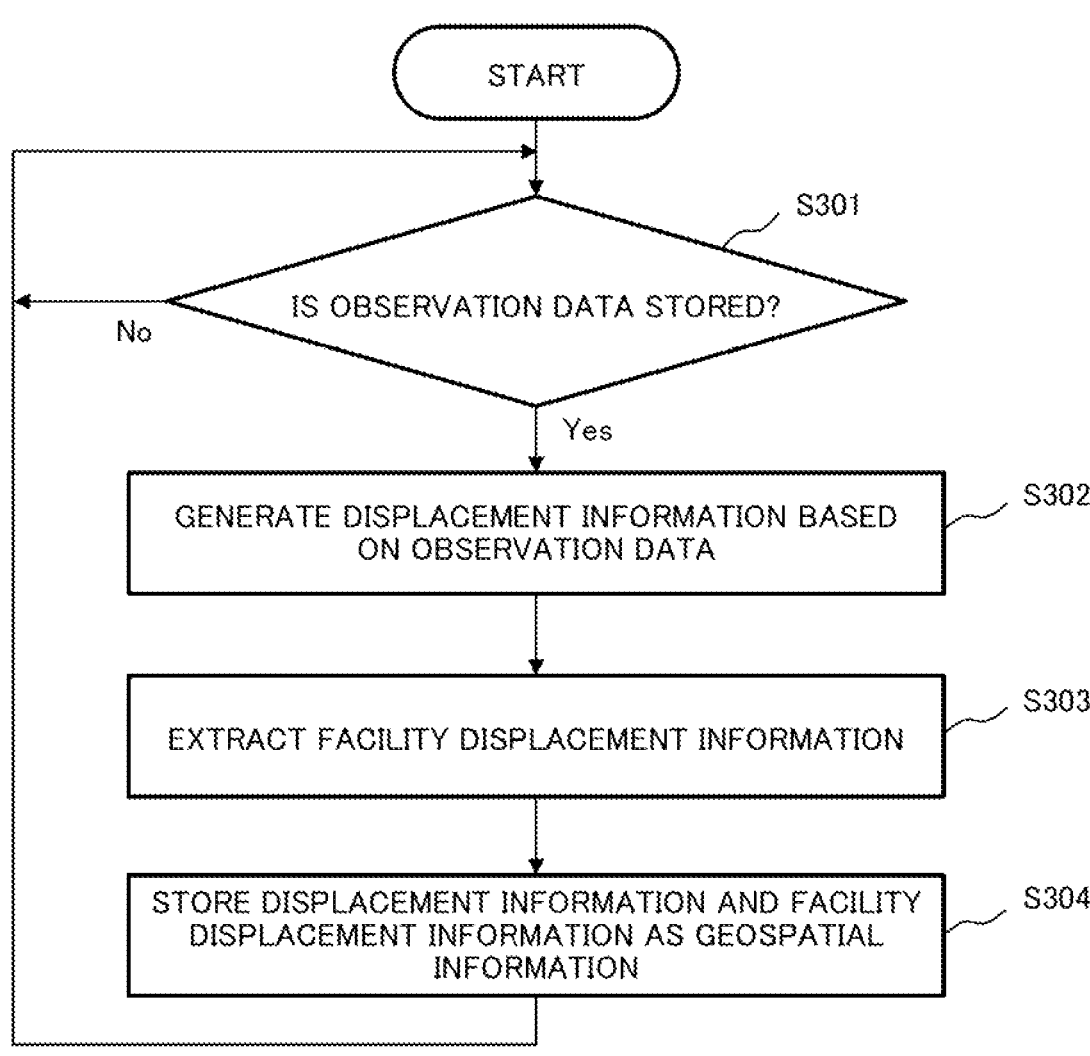
FIG. 8 is a flowchart illustrating an example of an operation of an information processing device for generating displacement information according to a first modification of the second example embodiment of the present disclosure.

FIG. 8 is a flowchart illustrating an example of an operation of an information processing device 101 according to the first modification for generating displacement information. When observation data is not stored in the observation data storage unit 310 ("No" in S301), the information processing device 101 according to the first modification does not generate displacement information. When observation data is stored in the observation data storage unit 310 ("Yes" in S301), the generation unit 130 generates displacement information based on the stored observation data and observation data obtained through observation in a range similar to that of the stored observation data (S302). Then, the extraction unit 111 extracts facility displacement information from the displacement information. In this case, the extraction unit 111 may extract the facility displacement information, for example, when the displacement information including the preset positions of the facilities is generated. Then, the generation unit 130 and the extraction unit 111 store the displacement information and the facility displacement information, respectively, as geospatial information (S304).

Figure 9:
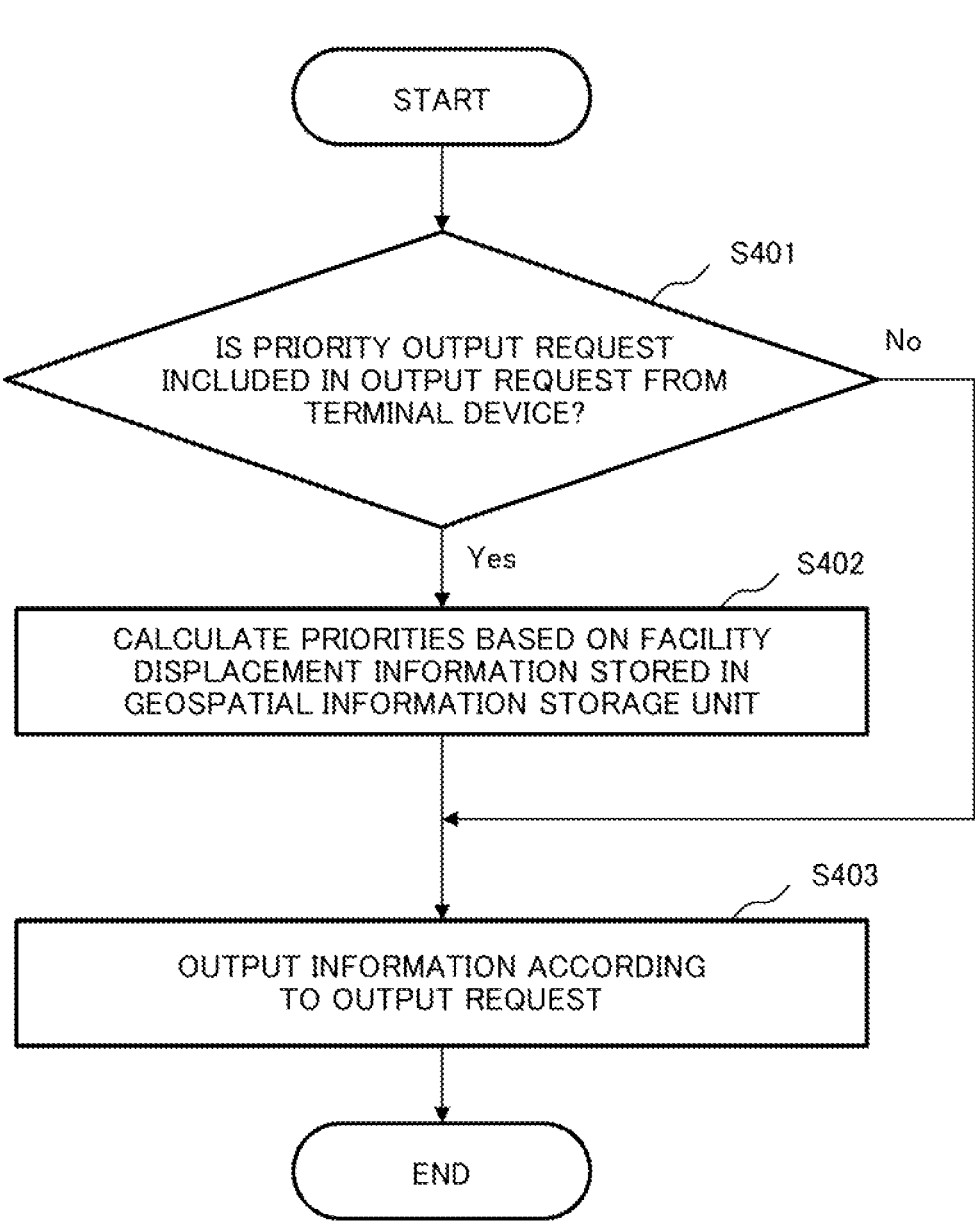
FIG. 9 is a flowchart illustrating an example of an operation when the information processing device receives an output request according to the first modification of the second example embodiment of the present disclosure.

FIG. 9 is a flowchart illustrating an example of an operation in a case where the information processing device 101 according to the first modification receives an output request from the terminal device 400. When the output request received by the reception unit 140 from the terminal device 400 includes a priority output request ("Yes" in S401), the calculation unit 121 calculates priorities based on the facility displacement information and the like stored in the geospatial information storage unit 320 (S402). When the output request received by the reception unit 140 from the terminal device 400 does not include a priority output request ("No" in S401), the calculation unit 121 does not perform the processing of S402. Then, the output control unit 150 outputs information according to the output request (S403). For example, when the priority output request is received, the output control unit 150 outputs information indicating the priorities to the terminal device 400. Furthermore, for example, when a geospatial information output request is received, the output control unit 150 outputs geospatial information according to the output request to the terminal device 400.

Third Example Embodiment

Figure 10:
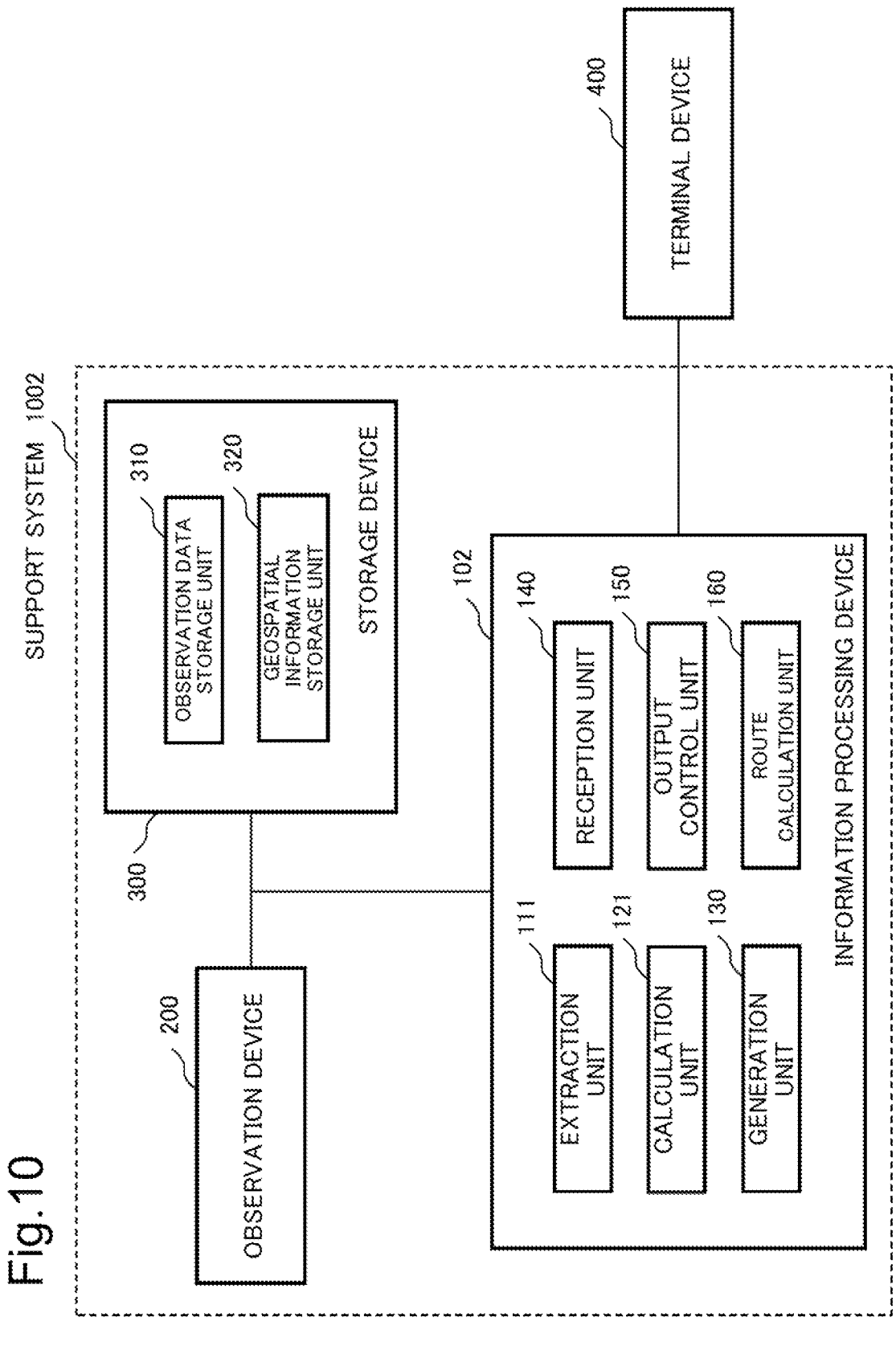
FIG. 10 is a block diagram including an example of a functional configuration of a support system according to a third example embodiment of the present disclosure.

Next, an information processing device according to a third example embodiment will be described. FIG. 10 is a block diagram including an example of a configuration of a support system 1002 according to the third example embodiment. As illustrated in FIG. 10, the support system 1002 includes an information processing device 102 instead of the information processing device 101 in the second example embodiment, and is otherwise similar to the support system 1001 described in the second example embodiment. That is, the support system 1002 includes an information processing device 102, an observation device 200, and a storage device 300. Note that the description in the third example embodiment overlapping with those in the first and second example embodiments will be partially omitted.

[Details of Information Processing Device 102]

As illustrated in FIG. 10, the information processing device 102 includes an extraction unit 111, a calculation unit 121, a generation unit 130, a reception unit 140, an output control unit 150, and a route calculation unit 160.

The route calculation unit 160 calculates a route connecting a predetermined departure point for facility inspection work and a facility. For example, it is assumed that the reception unit 140 receives a route output request from the terminal device 400. The route output request includes, for example, information indicating a predetermined departure point. The information indicating the predetermined departure point may be, for example, information indicating a current position of a worker who performs inspection work, information indicating a position of a vehicle for inspection, or information indicating a position of a business office owned by the business operator. For example, the route calculation unit 160 calculates a route based on the priorities. Specifically, for example, the route calculation unit 160 calculates a route connecting a departure point and a facility having the highest priority from information on a position of the facility having the highest priority and information on a position of the departure point. In addition, the route calculation unit 160 may specify a plurality of facilities having high priorities which are some of the facilities of which the priorities have been calculated, and calculate a route connecting the departure point and a location of each of the specified facilities.

In addition, the route calculation unit 160 may calculate a route passing through a plurality of facilities from the departure point. For example, inspection work may be sequentially performed on the plurality of facilities. In such a case, the route calculation unit 160 calculates, for example, a route passing through the plurality of facilities according to the priorities. For example, the route calculation unit 160 may calculate a route passing through the facilities in descending order of priority among the plurality of facilities. Note that it is not necessary to calculate a route in such a way as to pass through the facilities in descending order of priority. For example, based on the priorities and the positions of the facilities, the route calculation unit 160 may calculate a route optimized to be the shortest while preferentially passing through a facility having a high priority. At this time, a known algorithm related to the optimization issue may be used. In addition, the route calculation unit 160 may not calculate a route passing through all of the plurality of facilities. For example, the route calculation unit 160 may calculate a route passing through some facilities having high priorities among the plurality of facilities. For example, as described in the second example embodiment, in a case where a priority is indicated by the sum of scores, a route passing through a facility having a priority equal to or more than a predetermined value may be calculated.

In this manner, the route calculation unit 160 calculates a route connecting at least one facility for which a calculated priority is higher than at least one other facility, among the plurality of facilities, to a location of a departure point of a worker who performs inspection work. The route calculation unit 160 is an example of a route calculation means.

In addition, the route calculation unit 160 may calculate a route connecting a departure point and a facility by further using other various types of information. For example, the route calculation unit 160 may calculate the route based on displacement information. Specifically, for example, the route calculation unit 160 calculates a route connecting a departure point and a facility. At this time, the route may be calculated based on the priorities as described above, or may be calculated by another method. Then, when the calculated route includes a place where the value indicated by the displacement information is a predetermined value or more, the route calculation unit 160 calculates a route for bypassing the place. There may be a road that is not allowed to pass due to a landslide disaster, a flood, or the like. For such a road, it is highly likely that the value indicated by the displacement information may have greatly changed. Therefore, by calculating a route based on the displacement information, the route calculation unit 160 can calculate a route for bypassing a road that may be inaccessible. In this manner, the route calculation unit 160 may calculate a route not including a place where the value indicated by the displacement information satisfies a predetermined standard when the place is included in the calculated route.

When there is disaster information including information on damage caused by a disaster, the route calculation unit 160 may calculate a route using the disaster information. The information on damage caused by the disaster is, for example, information regarding a road that is inaccessible due to a mudslide caused by an earthquake, a flood of a river, or the like. The route calculation unit 160 may calculate a route for avoiding a road that is considered to be inaccessible using such disaster information. The route calculation unit 160 acquires the disaster information, for example, based on information included in the geospatial information storage unit 320. The disaster information may be, for example, information disclosed on the Internet. Alternatively, the disaster information may be information estimated from observation data, a satellite photographs, or the like. For example, it is possible to estimate an inaccessible road from observation data or satellite photographs before and after a disaster. In this manner, the route calculation unit 160 may calculate a route passing through at least one of the plurality of facilities according to the disaster information including a damage situation caused by a disaster.

[Operation of Information Processing Device 102]

Figure 11:
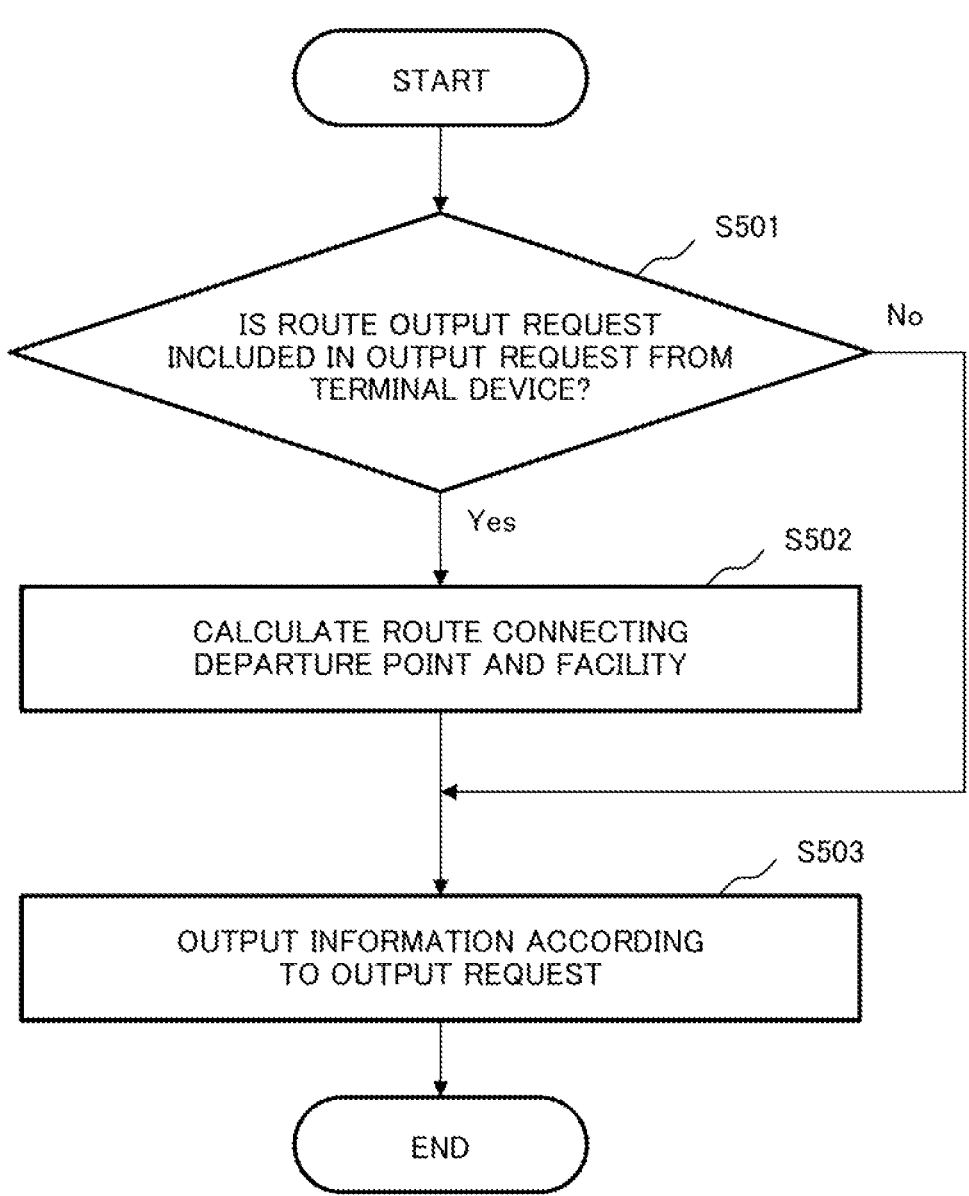
FIG. 11 is a flowchart illustrating an example of an operation of an information processing device according to the third example embodiment of the present disclosure.

Next, an operation of the information processing device 102 will be described. FIG. 11 is a flowchart illustrating an example of an operation of the information processing device 102. In the present example of the operation, which describes an example of an operation in a case where an output request is received from the terminal device 400. The output request received by the reception unit 140 includes a route output request ("Yes" in S501), the route calculation unit 160 calculates a route connecting a departure point and a facility (S502). The route output request includes, for example, information indicating a position of the departure point. In addition, in S502, the route calculation unit 160 calculates a route connecting, for example, a facility having a highest priority to the departure point. When the output request received by the reception unit 140 does not include a route output request ("No" in S501), the route calculation unit 160 does not perform the processing of S502.

Then, the output control unit 150 outputs information according to the output request (S503). For example, when the reception unit 140 receives a route output request, the output control unit 150 outputs an image in which the calculated route is superimposed on the map to the terminal device 400.

In this manner, the information processing device 102 according to the third example embodiment calculates a route connecting at least one facility for which a calculated priority is higher than at least one other facility, among the plurality of facilities, to a location of a departure point of a worker who performs inspection work. As a result, the information processing device 102 can present a route to a facility having a high priority to the business operator. Furthermore, the information processing device 102 may calculate a route not including a place where the value indicated by the displacement information satisfies a predetermined standard when the place is included in the calculated route. As a result, the information processing device 102 can present a route for avoiding a place that may be inaccessible, for example, due to a disaster or the like, to the business operator. That is, the information processing device 102 according to the third example embodiment can support facility inspection work.

Second Modification

Although the example in which the reception unit 140 receives a route output request including information indicating a predetermined departure point has been described, the route output request may further include information indicating a position of a facility. In this case, the route calculation unit 160 may calculate a route connecting the facility and the departure point indicated in the output request.

In addition, in a case where a route output request includes information indicating positions of a plurality of facilities, the route calculation unit 160 may calculate a route connecting each of the plurality of facilities and the departure point, or may calculate a route passing through the plurality of facilities from the departure point according to the priorities. At this time, the route calculation unit 160 may further use displacement information, disaster information, and the like.

Fourth Example Embodiment

Figure 12:
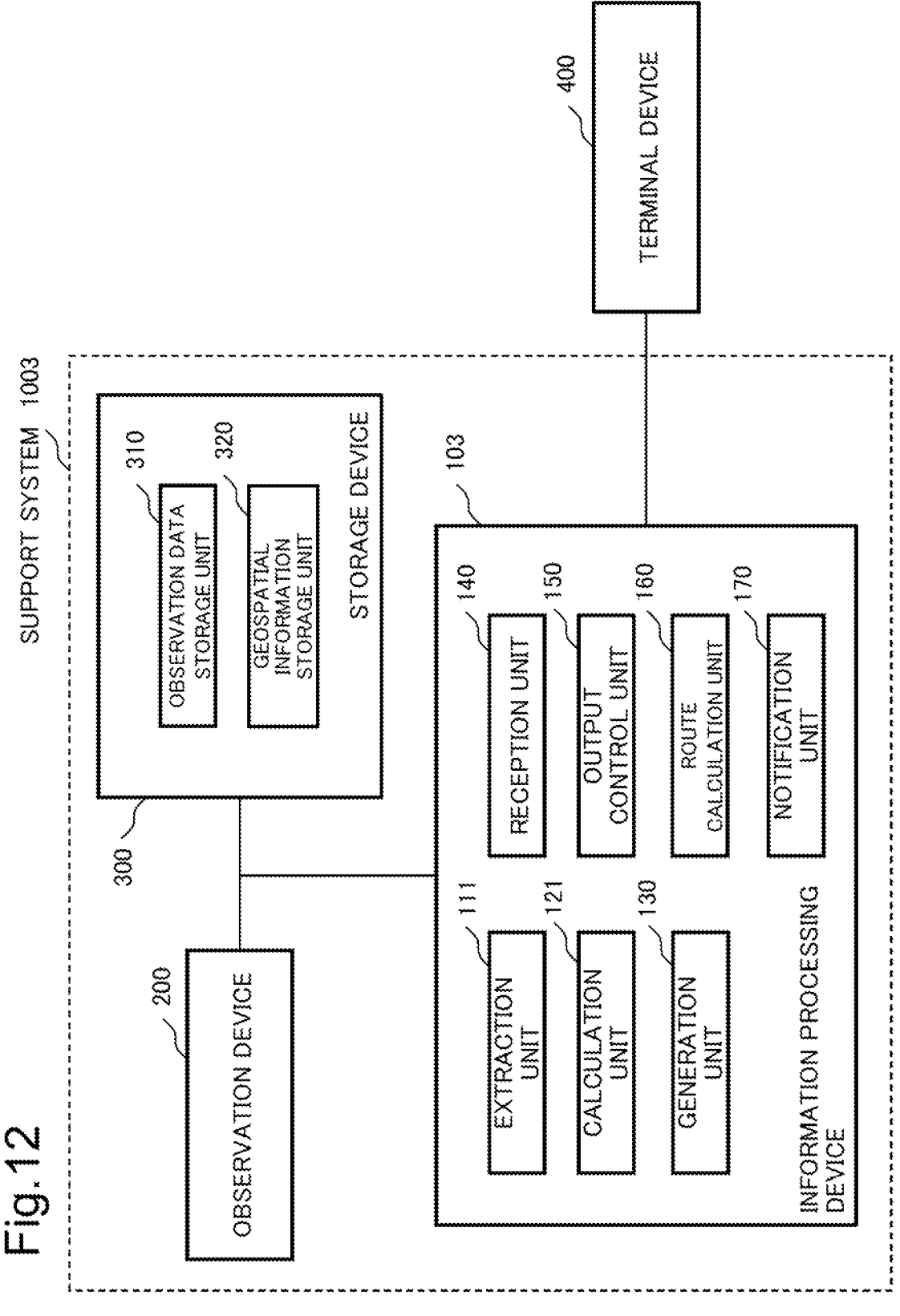
FIG. 12 is a block diagram including an example of a functional configuration of a support system according to a fourth example embodiment of the present disclosure.

Next, an information processing device according to a fourth example embodiment will be described. FIG. 12 is a block diagram including an example of a configuration of a support system 1003 according to the fourth example embodiment. As illustrated in FIG. 12, the support system 1003 includes an information processing device 103 instead of the information processing device 102 in the third example embodiment, and is otherwise similar to the support system 1002 described in the third example embodiment. That is, the support system 1003 includes an information processing device 103, an observation device 200, and a storage device 300. Note that the description in the fourth example embodiment overlapping with those in the first, second, and third example embodiments will be partially omitted.

[Details of Information Processing Device 103]

As illustrated in FIG. 12, the information processing device 103 includes an extraction unit 111, a calculation unit 121, a generation unit 130, a reception unit 140, an output control unit 150, a route calculation unit 160, and a notification unit 170.

When an abnormality has occurred in the facility, the notification unit 170 notifies an alarm indicating that the abnormality has occurred. For example, the alarm may be an image and a character output to the display device of the terminal device 400, or may be a voice emitted from a speaker included in the terminal device 400. Alternatively, the alarm may be a voice emitted from a speaker or the like installed in a business office owned by the business operator. Alternatively, the notification unit 170 may notify a server device that is not illustrated of an alarm. In this case, for example, a device in which an application capable of communicating with the server device is installed may be notified of the alarm on the application.

For example, the notification unit 170 determines a facility of which facility displacement information is equal to or more than a predetermined value to be abnormal. Then, information indicating the facility determined to be abnormal may be notified to the terminal device 400. In this manner, when a facility, in which it is determined that an abnormality has occurred based on the facility displacement information, is present, the notification unit 170 notifies an alarm indicating that the abnormality has occurred in the facility. The notification unit 170 is an example of a notification means.

The method of determining an abnormality of a facility is not limited to this example. For example, the notification unit 170 may determine an abnormality of a facility according to a result of measuring a degree of progress of corrosion such as rust generated in the facility. Furthermore, for example, the notification unit 170 may determine that an abnormality has occurred in the facility when oil leakage, water leakage, and electric leakage are detected in the facility. Furthermore, for example, in a case where a priority is indicated by the sum of scores as described in the second example embodiment, the notification unit 170 may determine that a facility having a priority equal to or more than a predetermined value is abnormal.

[Operation of Information Processing Device 103]

Figure 13:
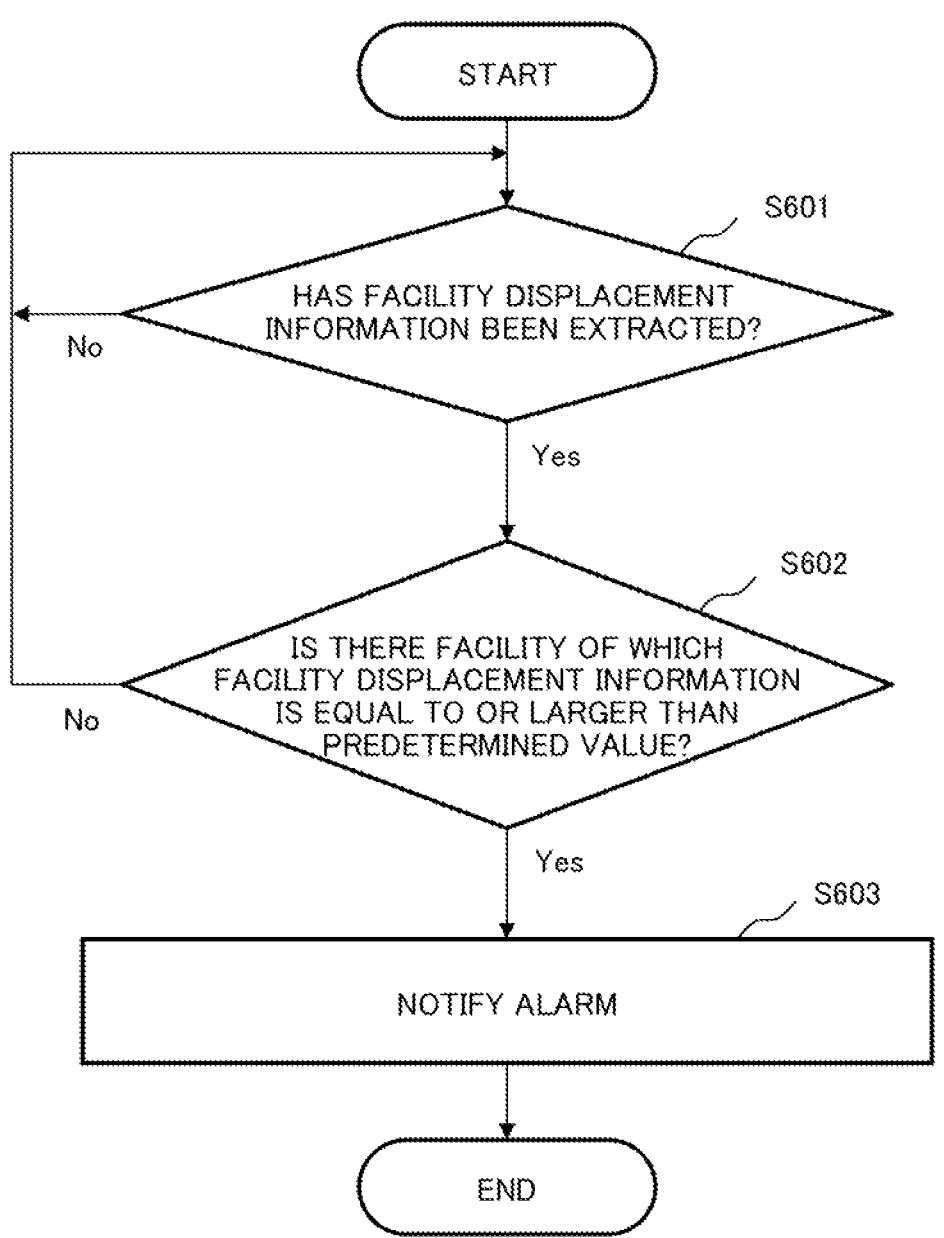
FIG. 13 is a flowchart illustrating an example of an operation of an information processing device according to the fourth example embodiment of the present disclosure.

Next, an operation of the information processing device 103 will be described. FIG. 13 is a flowchart illustrating an example of an operation of the information processing device 103. In the present example of the operation, an example in which an alarm is notified based on facility displacement information will be described.

When the facility displacement information has been extracted ("Yes" in S601), the notification unit 170 determines whether the extracted facility displacement information is a predetermined value or more. At this time, when the facility displacement information of the plurality of facilities is extracted, the notification unit 170 determines whether each piece of the facility displacement information is equal to or more than the predetermined value. Then, when there is a facility of which the facility displacement information is equal to or more than the predetermined value ("Yes" in S602), the notification unit 170 notifies an alarm (S603). For example, the notification unit 170 notifies the terminal device 400 that the facility displacement information is equal to or more than the predetermined value, that is, that an abnormality has occurred, together with facility information of the facility in which it is determined that the abnormality has occurred.

When facility displacement information has not been extracted ("No" in S601) or when there is no facility of which facility displacement information is equal to or more than the predetermined value ("No" in S602), the notification unit 170 does not perform the processing of S603.

In this manner, when there is a facility in which it is determined that an abnormality has occurred based on the facility displacement information, the information processing device 103 according to the fourth example embodiment notifies an alarm indicating that the abnormality has occurred in the facility. As a result, it is possible to promptly notify the business operator that the abnormality has occurred in the facility. That is, the information processing device 103 according to the fourth example embodiment can support facility inspection work.

<Example of Hardware Configuration of Information Processing Device>

Figure 14:
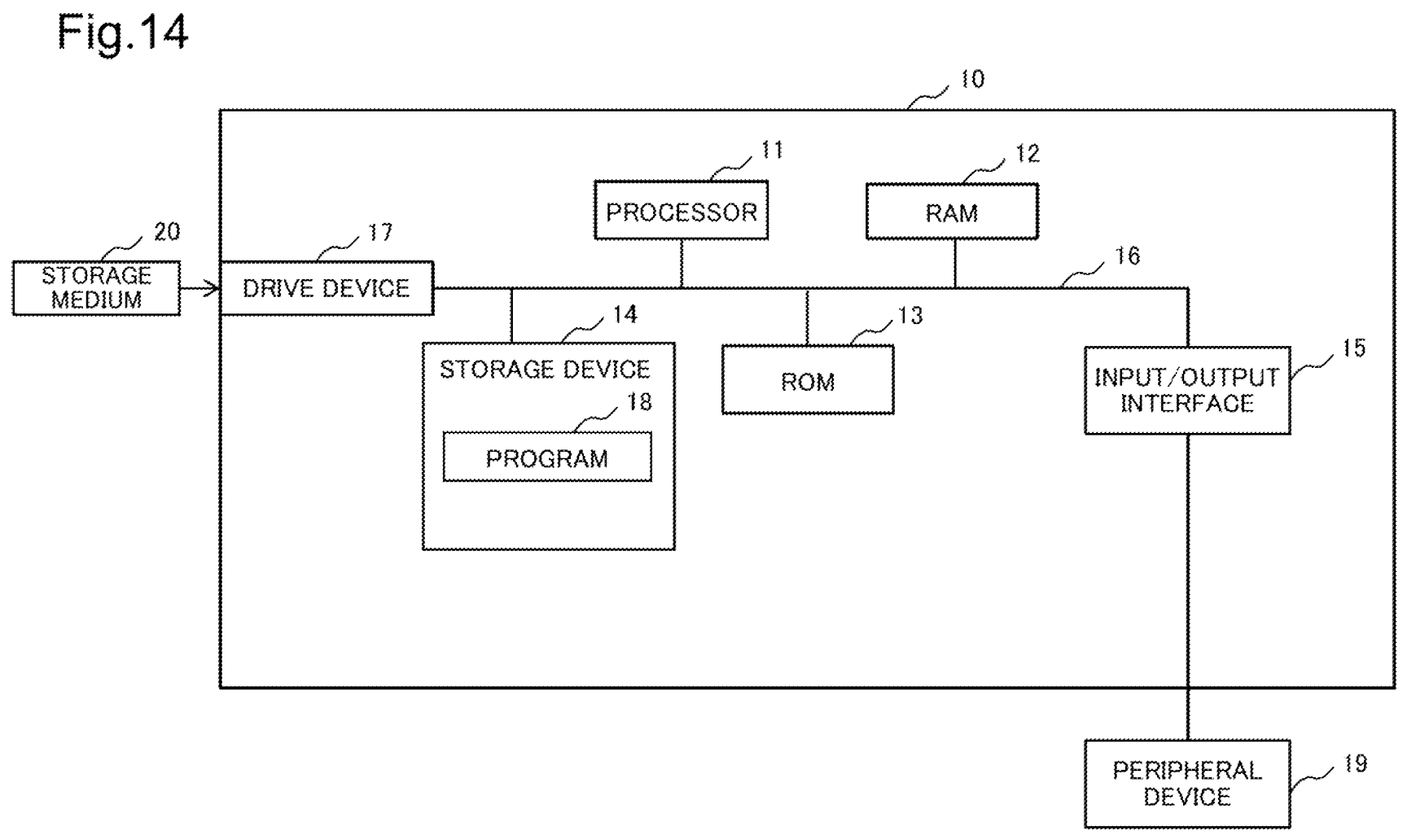

The hardware constituting the information processing device according to each of the first, second, third, and fourth example embodiments will be described. FIG. 14 is a block diagram illustrating an example of a hardware configuration of a computer device for achieving the information processing device according to each example embodiment. Each block illustrated in FIG. 14 can be implemented by combining software with a computer device 10 for achieving the information processing device and the information processing method in each example embodiment.

As illustrated in FIG. 14, the computer device 10 includes a processor 11, a random access memory (RAM) 12, a read only memory (ROM) 13, a storage device 14, an input/output interface 15, a bus 16, and a drive device 17. Note that the information processing device may be implemented by a plurality of electric circuits.

The storage device 14 stores a program (computer program) 18. The processor 11 executes the program 18 of the present information processing device using the RAM 12. Specifically, for example, the program 18 includes a program that causes the computer to execute the processing illustrated in FIGS. 3, 7, 8, 9, 11, and 13. As the processor 11 executes the program 18, the functions of the components (the extraction unit 110 or 111, the calculation unit 120 or 121, and the like described above) of the present information processing device are implemented. The program 18 may be stored in the ROM 13. In addition, the program 18 may be recorded in the storage medium 20 and read using the drive device 17, or may be transmitted from an external device that is not illustrated to the computer device 10 via a network that is not illustrated.

The input/output interface 15 exchanges data with peripheral devices (keyboard, mouse, display device, etc.) 19. The input/output interface 15 functions as a means for acquiring or outputting data. The bus 16 connects the components to each other.

Note that there are various modifications to the method for implementing the information processing device. For example, the information processing device can be implemented as a dedicated device. Furthermore, the information processing device can be implemented based on a combination of a plurality of devices.

The processing method for causing the storage medium to record a program for implementing each of the components for the function of each example embodiment, reading the program recorded in the storage medium as a code, and executing the program in the computer also falls within the scope of each example embodiment. That is, a computer-readable storage medium also falls within the scope of each example embodiment. In addition, a storage medium in which the above-described program is recorded and the program itself also fall within each example embodiment.

The storage medium is, for example, a floppy (registered trademark) disk, a hard disk, an optical disk, a magneto-optical disk, a compact disc (CD)-ROM, a magnetic tape, a nonvolatile memory card, or a ROM, but is not limited to this example. In addition, the program recorded in the storage medium is not limited to a program that is processed alone, and a program that is processed while being operated on an operating system (OS) in cooperation with functions of another software and an extension board also falls within the scope of each example embodiment.

While the disclosure has been particularly shown and described with reference to exemplary embodiments thereof, the disclosure is not limited to these embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2020-218133, filed on Dec. 28, 2020, the disclosure of which is incorporated herein in its entirety by reference.

REFERENCE SIGNS LIST

100, 101, 102, 103 information processing device
110, 111 extraction unit
120, 121 calculation unit
130 generation unit
140 reception unit
150 output control unit
160 route calculation unit
170 notification unit
200 observation device
300 storage device
400 terminal device

The invention claimed is:

1. An information processing device comprising:
a memory; and
at least one processor coupled to the memory, the at least one processor performing operations to:
extract, from displacement information indicating a displacement of a height of a ground surface at a plurality of locations, facility displacement information indicating a displacement of each facility of a plurality of facilities installed on the ground surface, wherein
the displacement information indicates a change in elevation at each location of the plurality of locations, and
each facility of the plurality of facilities is located at a location of the plurality of locations; and
determine inspection work priority information for the plurality of facilities using the facility displacement information.

2. The information processing device according to claim 1, wherein the at least one processor further performs operation to:
determine the priority information by further using facility information including at least one of degrees of importance of the plurality of facilities, building ages of the plurality of facilities, useful lives of the plurality of facilities, information on positions of the plurality of facilities, or inspection histories of the plurality of facilities.

3. The information processing device according to claim 1, wherein the at least one processor further performs operation to:
determine the priority information by further using information indicating a distance between a site where a disaster occurred and a position of each of the plurality of facilities.

4. The information processing device according to claim 1, wherein the at least one processor further performs operation to:

determine a first route connecting a first facility of the plurality of facilities to a location of a departure point of a worker who performs inspection work, wherein the first facility has a priority level greater than a second facility of the plurality of facilities.

5. The information processing device according to claim 4, wherein the at least one processor further performs operation to:

determine a second route not including a place where a value indicated by the displacement information satisfies a predetermined standard, wherein the second route is determined as a result of the place being included in the first route.

6. The information processing device according to claim 1, wherein the at least one processor further performs operation to:

generate the displacement information based on observation data obtained at a plurality of time points, wherein the observation data is data based on a result of observing the ground surface from the sky, the observation data being generated by a synthetic aperture radar.

7. The information processing device according to claim 6, wherein observation data is generated by a first observation device and a second observation device.

8. The information processing device according to claim 1, wherein the at least one processor further performs operation to:

determine that an abnormality has occurred at a facility of the plurality of facilities based on the facility displacement information;

as a result of determining the abnormality, notify an alarm indicating that the abnormality has occurred in the facility.

9. An information processing method comprising:

extracting, from displacement information indicating a displacement of a ground surface at a plurality of locations, facility displacement information indicating a displacement of each facility of a plurality of facilities installed on the ground surface, wherein the displacement information indicates a change in elevation at each location of the plurality of locations, and each facility of the plurality of facilities is located at a location of the plurality of locations; and determining inspection work priority information for the plurality of facilities using the facility displacement information.

10. A non-transitory computer-readable storage medium storing a program for causing a computer to execute:

extracting, from displacement information indicating a displacement of a ground surface at a plurality of locations, facility displacement information indicating a displacement of each facility of a plurality of facilities installed on the ground surface, wherein the displacement information indicates a change in elevation at each location of the plurality of locations, and each facility of the plurality of facilities is located at a location of the plurality of locations; and determining inspection work priority information for the plurality of facilities using the facility displacement information.

\* \* \* \* \*